(12) United States Patent
Maltz

(10) Patent No.: US 9,916,006 B2
(45) Date of Patent: *Mar. 13, 2018

(54) EYE-WEARABLE DEVICE USER INTERFACE AND METHOD

(71) Applicant: Telepatheye Inc., Hayward, CA (US)

(72) Inventor: Gregory A. Maltz, Hayward, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/716,510

(22) Filed: May 19, 2015

(65) Prior Publication Data

US 2015/0323990 A1    Nov. 12, 2015

Related U.S. Application Data

(63) Continuation-in-part of application No. 14/066,654, filed on Oct. 29, 2013, which is a continuation-in-part
(Continued)

(51) Int. Cl.
*G06F 3/01* (2006.01)
*H04N 7/14* (2006.01)
(Continued)

(52) U.S. Cl.
CPC ......... *G06F 3/013* (2013.01); *G02B 27/0093* (2013.01); *G02B 27/017* (2013.01);
(Continued)

(58) Field of Classification Search
CPC ............ G02B 27/017; G02B 2027/014; G02B 2027/0138; G02B 27/0179;
(Continued)

(56) References Cited

U.S. PATENT DOCUMENTS

| 5,627,567 A | * | 5/1997 | Davidson | G06F 3/0488 345/170 |
| 6,323,884 B1 | * | 11/2001 | Bird | G06F 3/04812 715/810 |

(Continued)

FOREIGN PATENT DOCUMENTS

WO    WO2009024400    *    2/2009    ............. G02B 27/22

OTHER PUBLICATIONS

"EyeSpeech Touch V1.0" video uploaded on Youtube on May 7, 2014 at: https://www.youtube.com/watch?v=B8o5sJFSom8.

*Primary Examiner* — Mihir K Rayan
(74) *Attorney, Agent, or Firm* — Stephen E. Zweig

(57) ABSTRACT

A software controlled user interface and method for a head-mountable device equipped with at least one display, and connectivity to at least one touch pad. The method can scale between displaying a small to large number of different eye gaze target symbols at any given time, yet still transmit a large array of different symbols to outside devices. At least part of the method may be implemented by way of a virtual window onto the surface of a virtual cylinder, with touchpad or eye gaze sensitive symbols that can be rotated by touchpad touch or eye gaze thus bringing various groups of symbols into view, and then selected. Specific examples of use of this interface and method on a head-mountable device are disclosed, along with various operation examples including sending and receiving text messages, moving about in virtual or augmented reality, control of robotic devices and control of remote vehicles.

20 Claims, 12 Drawing Sheets

Related U.S. Application Data of application No. 13/117,146, filed on May 27, 2011, now Pat. No. 8,539,375, which is a continuation-in-part of application No. 12/842,315, filed on Jul. 23, 2010, now Pat. No. 8,531,355, and a continuation-in-part of application No. 13/034,182, filed on Feb. 24, 2011, now Pat. No. 8,531,394.

(51) Int. Cl.
| | | |
|---|---|---|
| *G02B 27/01* | (2006.01) | |
| *G06F 3/041* | (2006.01) | |
| *G06F 3/0481* | (2013.01) | |
| *G02B 27/00* | (2006.01) | |
| *G06F 3/0484* | (2013.01) | |

(52) U.S. Cl.
CPC ..... *G02B 27/0172* (2013.01); *G02B 27/0179* (2013.01); *G06F 3/016* (2013.01); *G06F 3/017* (2013.01); *G06F 3/0412* (2013.01); *G06F 3/04817* (2013.01); *G06F 3/04845* (2013.01); *H04N 7/144* (2013.01); *G02B 2027/014* (2013.01); *G02B 2027/0138* (2013.01); *G02B 2027/0178* (2013.01); *G02B 2027/0187* (2013.01); *G06F 2203/04104* (2013.01); *G06F 2203/04808* (2013.01); *G09G 2320/0261* (2013.01)

(58) Field of Classification Search
CPC ............ G02B 27/0093; G02B 27/0172; G02B 2027/0178; G02B 2027/0187; G06F 3/013; G06F 3/0412; G06F 3/017; G06F 3/04817; G06F 3/04845; G06F 3/016; G06F 2203/04104; G06F 2203/04808; H04N 7/144; G09G 2320/0261

See application file for complete search history.

(56) References Cited

U.S. PATENT DOCUMENTS

| | | | | |
|---|---|---|---|---|
| 6,349,001 B1* | 2/2002 | Spitzer | ............... | G02B 27/017 345/8 |
| 6,369,952 B1* | 4/2002 | Rallison | ............... | G02B 27/017 359/630 |
| 6,456,262 B1* | 9/2002 | Bell | ....................... | A61B 3/113 345/472 |
| 6,867,752 B1* | 3/2005 | Yamazaki | ........... | G02B 27/017 345/206 |
| 7,013,258 B1* | 3/2006 | Su | .......................... | G06F 3/013 345/171 |
| 7,113,170 B2* | 9/2006 | Lauper | .................... | G06F 21/36 345/158 |
| 8,223,088 B1* | 7/2012 | Gomez | ................ | G02B 27/017 345/7 |
| 8,531,355 B2* | 9/2013 | Maltz | ...................... | H04W 4/20 345/8 |
| 8,531,394 B2* | 9/2013 | Maltz | ...................... | G02B 7/287 345/156 |
| 8,593,375 B2* | 11/2013 | Maltz | ...................... | G06F 3/013 345/8 |
| 9,046,685 B2* | 6/2015 | Nakada | ................ | G02B 27/017 |
| 2004/0155907 A1* | 8/2004 | Yamaguchi | ........... | G06F 3/0481 715/810 |
| 2006/0044265 A1* | 3/2006 | Min | ..................... | G02B 27/017 345/156 |
| 2006/0103591 A1* | 5/2006 | Tanimura | .............. | G06F 1/3218 345/8 |
| 2007/0152979 A1* | 7/2007 | Jobs | ....................... | G06F 3/0236 345/173 |
| 2008/0055273 A1* | 3/2008 | Forstall | ............... | G06F 3/04817 345/173 |
| 2008/0134086 A1* | 6/2008 | Liao | ...................... | G06F 3/0482 715/810 |
| 2010/0079356 A1* | 4/2010 | Hoellwarth | .......... | G02B 27/017 345/8 |
| 2011/0205162 A1* | 8/2011 | Waller | ................... | B60K 35/00 345/173 |
| 2011/0214082 A1* | 9/2011 | Osterhout | ............ | G02B 27/017 715/773 |
| 2012/0218303 A1* | 8/2012 | Nakada | ................ | G02B 27/017 345/649 |
| 2013/0258270 A1* | 10/2013 | Cazalet | .................. | G02C 11/10 351/114 |

\* cited by examiner

Figure 2
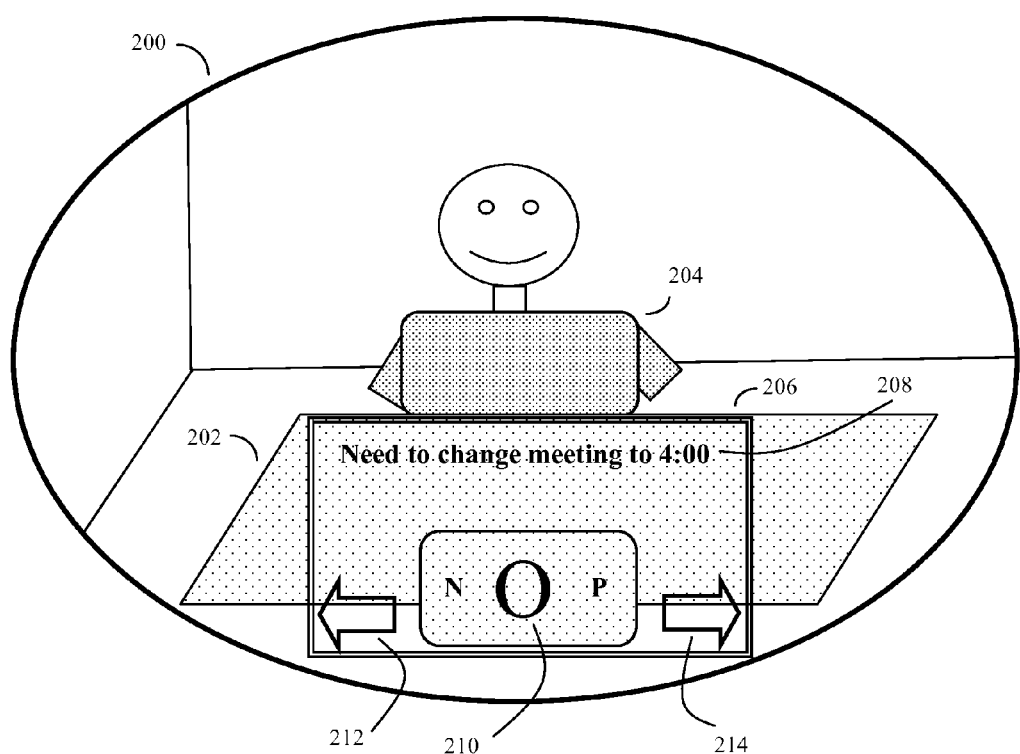
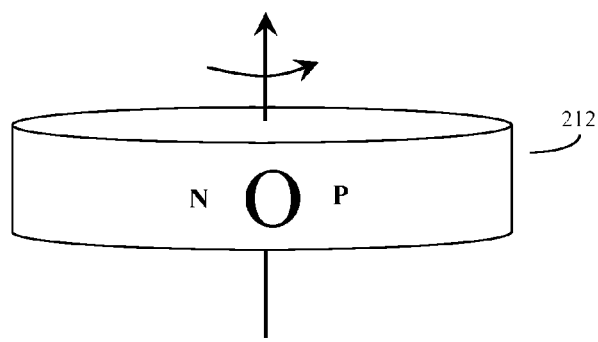

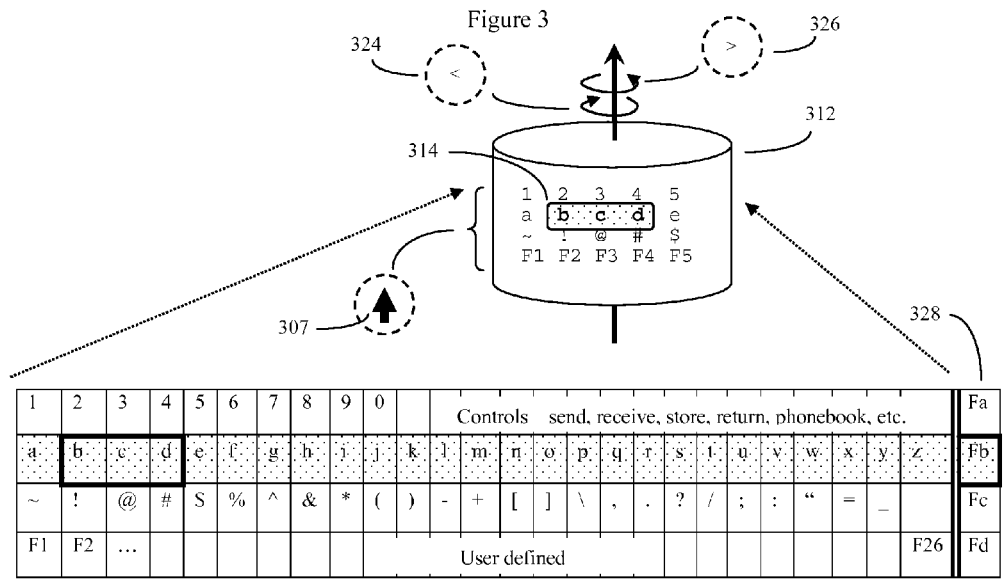
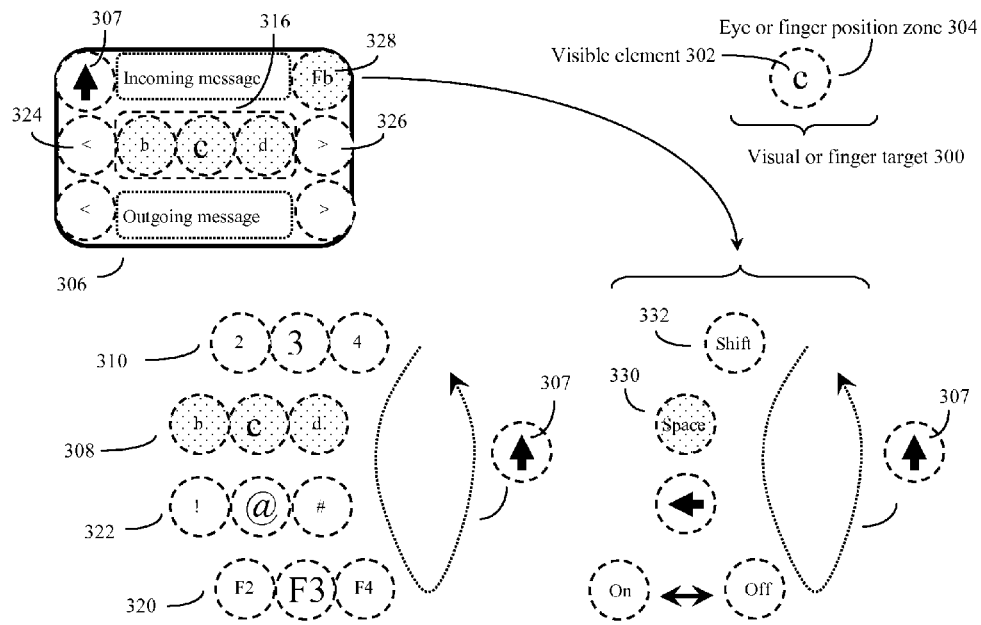
Main symbols vary by row and column    Fa-Fd keys only shift according to row Figure 5
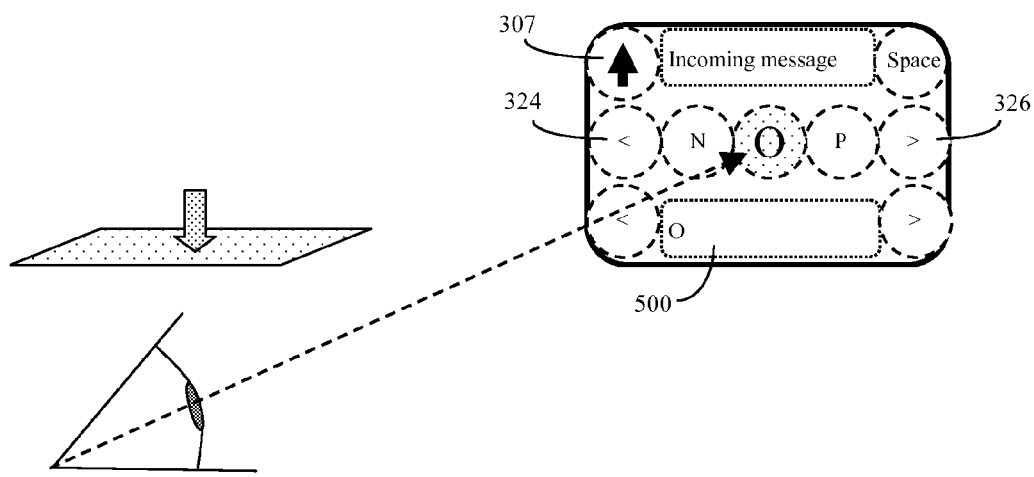
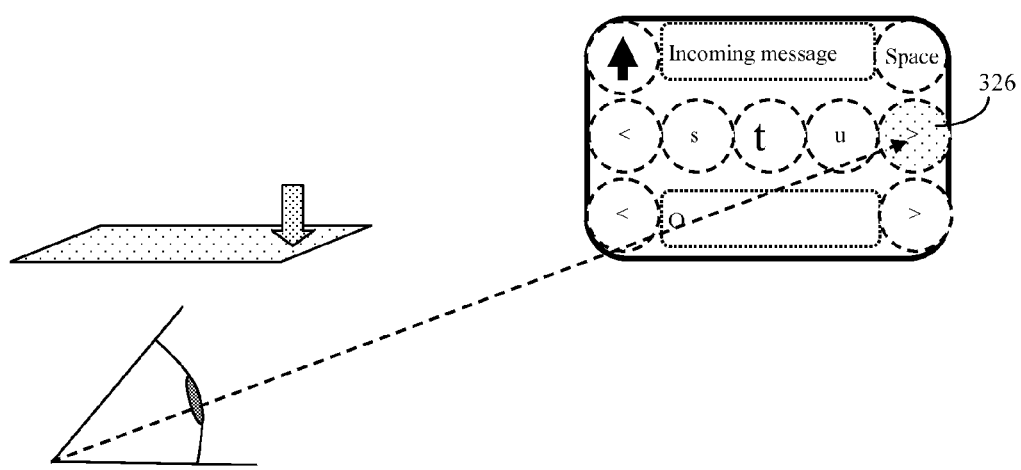

Figure 6
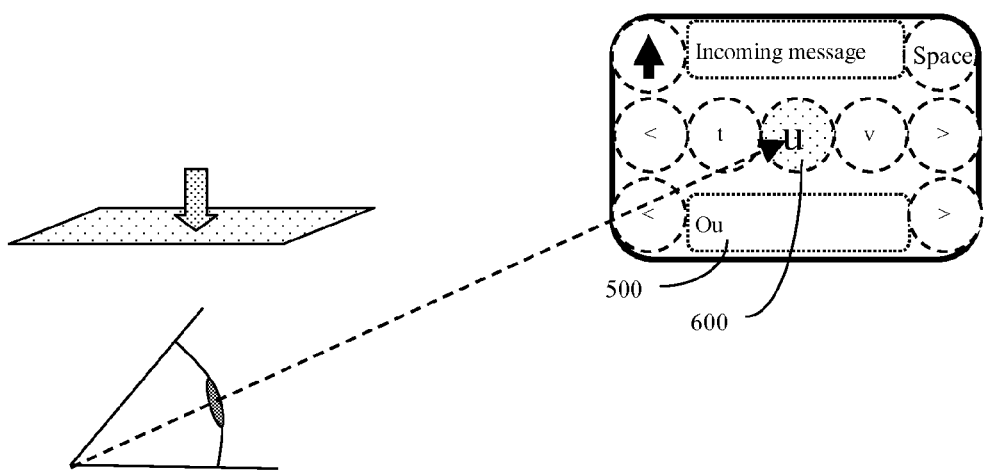
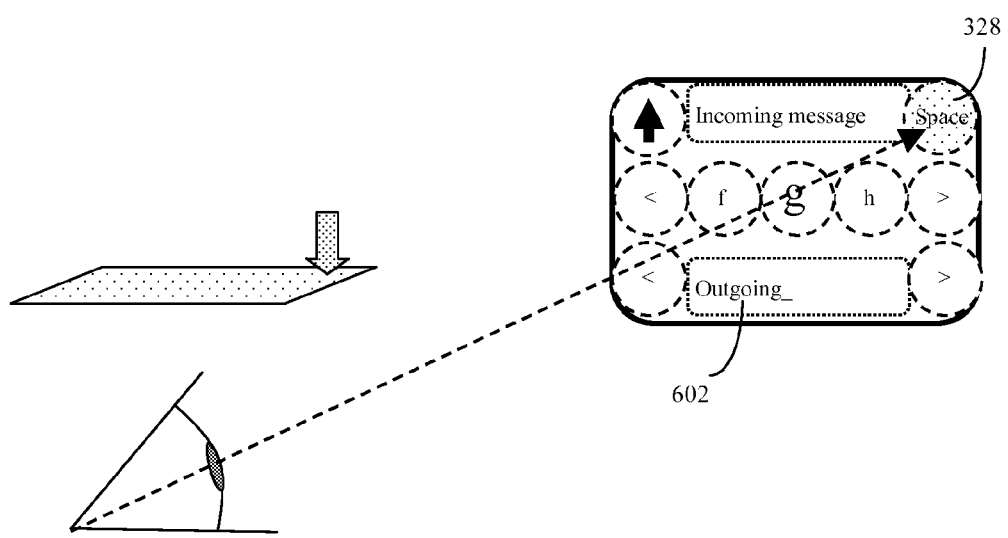

Figure 9
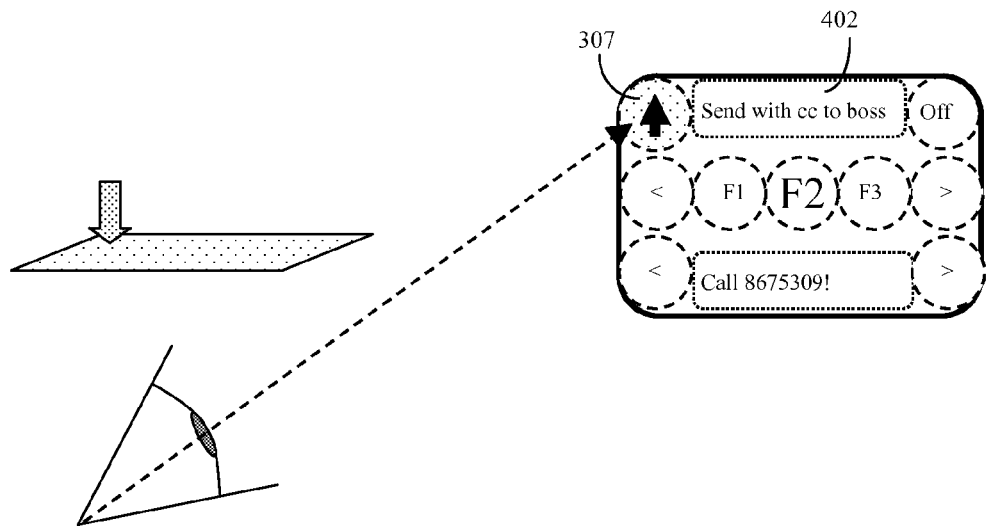
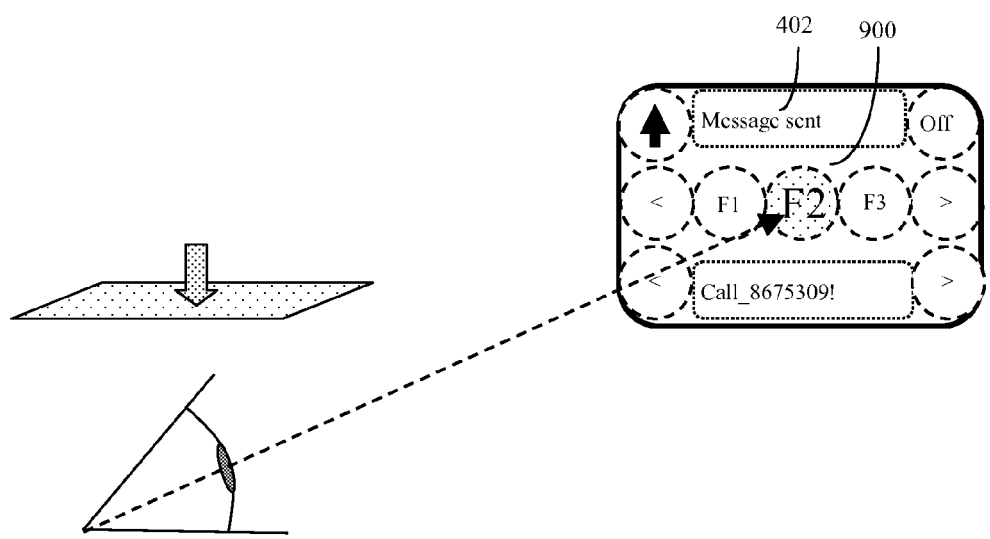

Figure 10
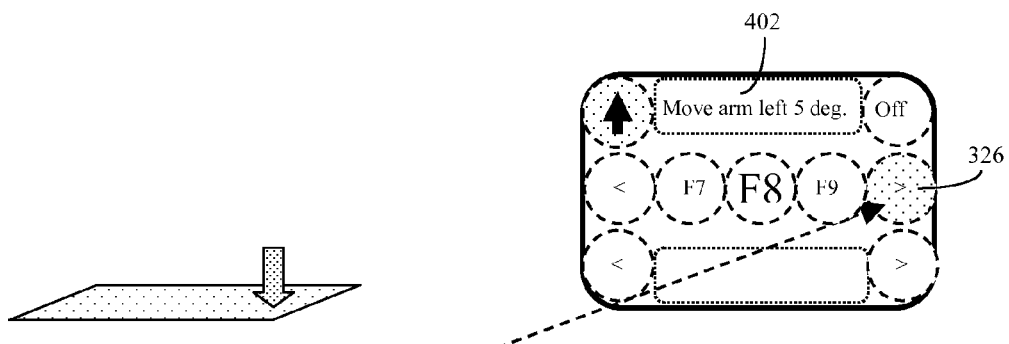
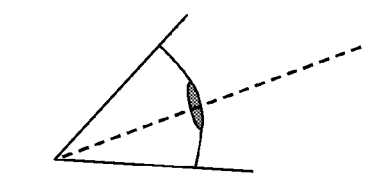
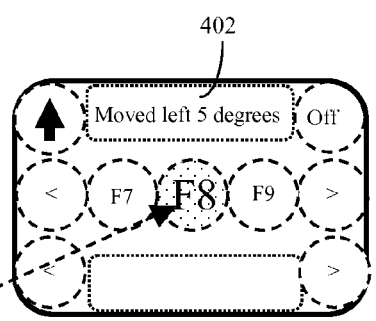
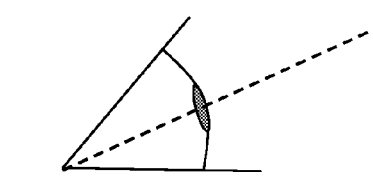
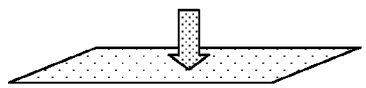

EYE-WEARABLE DEVICE USER INTERFACE AND METHOD

This application is a continuation in part of U.S. patent application Ser. No. 14/066,654, "EYE GAZE USER INTERFACE AND CALIBRATION METHOD", filed Oct. 29, 2013; Ser. No. 14/066,654 was a continuation in part of U.S. patent application Ser. No. 13/117,146, "EYE GAZE USER INTERFACE AND METHOD" filed May 27, 2011, now U.S. Pat. No. 8,593,375; Ser. No. 13/117,146 in turn was a continuation in part of U.S. patent application Ser. No. 13/034,182 filed Feb. 24, 2011, now U.S. Pat. No. 8,531, 394; Ser. No. 13/117,146 was also a continuation in part of U.S. patent application Ser. No. 12/842,315, "Unitized, Vision-Controlled, Wireless Eyeglass Transceiver", filed Jul. 23, 2010; now U.S. Pat. No. 8,531,355; the contents of all of these applications are incorporated herein by reference in their entirety.

BACKGROUND OF THE INVENTION

Field of the Invention

The invention is in the field of user interfaces for head-mounted displays, particularly as applied to the control of wireless communication and other devices.

Description of the Related Art

As cellular telephones and other mobile devices have proliferated, so has the expectation that individuals will always have the option to instantly operate their devices and communicate with their contacts. Thus in both business and in private matters, when an individual is not able to instantly respond to at least text messages, this expectation goes unmet, and social friction and/or lost business opportunities can result. Although cell phone and text communications are often infeasible during certain times of the day, the perception remains that the only reason why the recipient of a message may not have responded is due to a deliberate desire of the recipient to ignore the message.

However the act of turning on a cell phone, scrolling through incoming text messages, and then responding to the text messages can be obtrusive, conspicuous and in some situations inappropriate. Thus there are many times when it is inadvisable or socially awkward to break off a conversation to respond to an incoming cellular phone text message. Indeed, an important client or loved one may be insulted if this occurs. Thus at present, a cell phone user is faced with the difficult problem of trying to balance priority between the environment e.g., a person they are talking to face to face, versus the person who is trying to contact them.

Indeed, there are many situations in life where non-handicapped persons may also wish to inconspicuously eye control various types of devices as well.

BRIEF SUMMARY OF THE INVENTION

In one embodiment, the invention may be a software controlled user interface and method for an eye wearable device, designed to accommodate angular accuracy versus time averaging tradeoffs for either eye gaze direction or fingertip detection. The method is simple, intuitive, and can scale between displaying a small to large number of different target symbols at any given time, yet still transmit a large array of different symbols to outside devices with minimal user training. At least part of the method may be implemented by way of a virtual window onto the surface of a virtual cylinder, with sensitive symbols that can be rotated either changes in eye gaze direction, e.g., pupil position, or alternatively by fingertip swiping to bring various groups of symbols into view, and then selected. Specific examples of use of this interface and method on an eyeglasses-like head-mountable, device are disclosed, along with various operation examples including sending and receiving text messages and control of the device as well as external devices.

The method will generally use either at least one eye position sensor or touch sensor (such as a touchpad—i.e. a touch-tracking touchpad sensor or other type of touch sensor, which may be built into the device or alternatively tethered physically or wirelessly to the device) to determine how the user is interacting with a plurality of visible elements displayed by the eye wearable device's screen or other type of display. A virtual touchpad projected by the eye wearable device may also be used instead of a hardware touchpad. The method will keep track of either the user's eye gaze direction, or the user's finger movement, and make visual changes in the display.

Alternatively, the invention may signal the user by other sensory means such as mild vibration, sound, or other method.

In some embodiments, the user operates the interface by either letting the user's eye gaze or finger position continue to remain within an eye (or finger) position zone for a particular visible element for a time period exceeding a certain period of time (usually on the order of around 0.25 seconds), or alternatively (for touch sensor control) scrolling and selecting or tapping a virtual cursor or keys. The user and system can then use this "virtual key press" to control various functions such as transmitting or receiving information, retrieving or storing information in memory, general system control, and controlling other outside devices as well.

In particular, the method will often use an interface based on the concept of a virtual rotating wheel, cylinder, or other virtual surface, such as virtual solid that has various visible elements, again often symbols such as letters, numbers, and punctuation marks, around the surface or circumference of this virtual sold. Only some of the visible elements will generally be presented at any one time to the user via the virtual display, but by either gazing or using fingertip commands to rotate the virtual solid, or move to different rows of symbols on the surface of this virtual solid, the sequence of displayed visible elements can be scrolled through in a predictable manner. When touch control is desired, touches on the touchpad can be registered as a keystroke by the system, and thus used for various functions as described above. Likewise, swiping the finger up, down, or side to side can rotate the virtual solid to rapidly scroll through the virtual keys, symbols, or data to access the desired content.

BRIEF DESCRIPTION OF THE DRAWINGS

FIG. 2 shows an example of a user's view through the device of FIG. 1A or FIG. 1B, showing a simplified version of the invention's user interface.

FIG. 3 shows a more detailed overview of the invention's user interface and method.

FIG. 5 shows the user interface in full active mode.

FIG. 6 shows a user generating an outgoing message.

FIG. 9 shows a user using special purpose function keys.

FIG. 10 shows a user either the eye gaze or touchpad interface to control a device.

DETAILED DESCRIPTION OF THE INVENTION

Figure 1A:
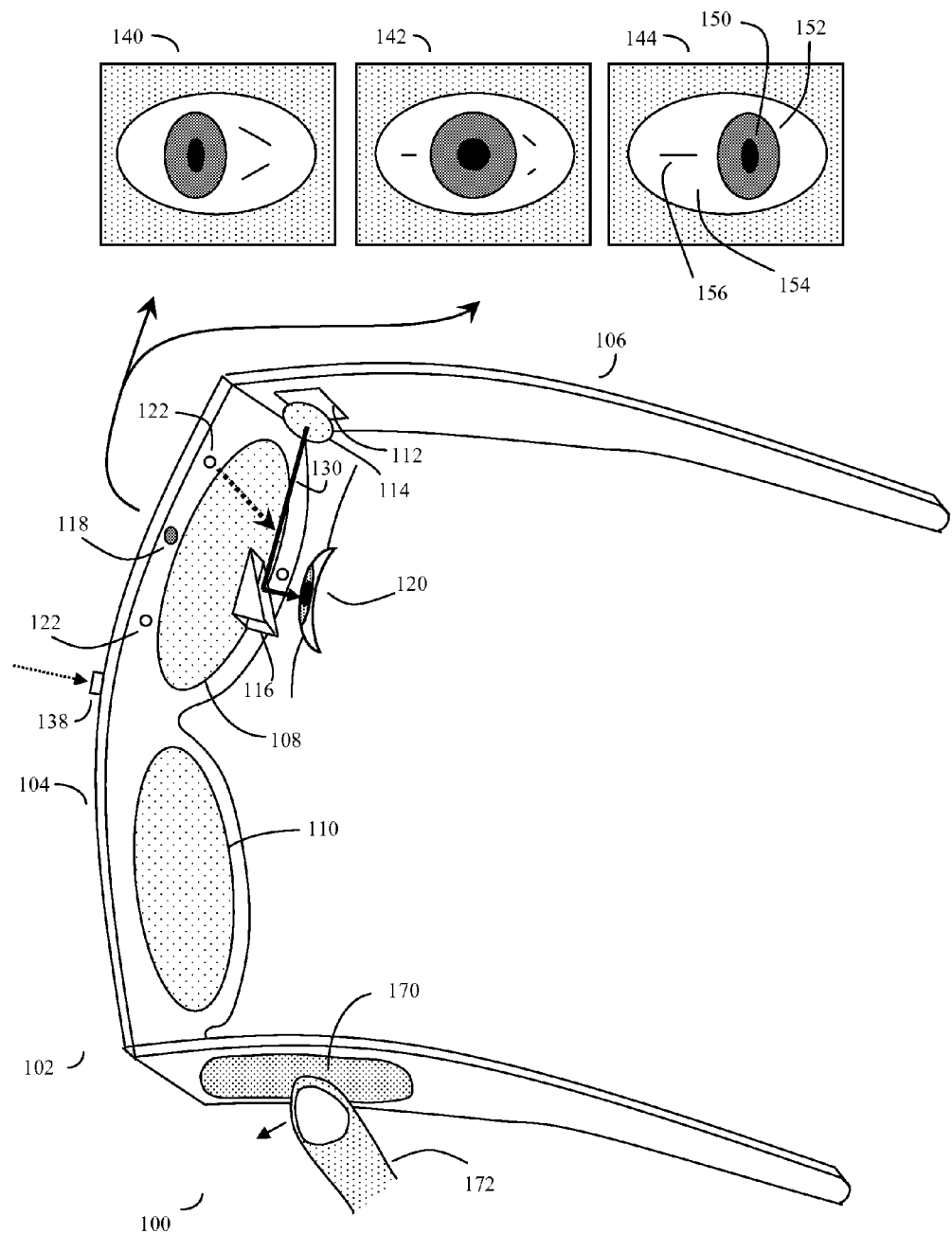
FIG. 1A shows an example of one type of device where either the invention's eye gaze user interface or the invention's touch sensor/touchpad interface may be implemented.

Although various eye wearable devices have been proposed, exemplified by parent patent application Ser. Nos. 14/066,654, 13/117,146, 13/034,182, and 12/842,315, the contents of which are incorporated herein by reference, the challenge is to solve a complex problem of devising a simple to use but flexible user interface to control these devices. Here the problems in designing such a user interface should be appreciated. To avoid bombarding the user with too many targets that will crowd the vision and render the interface unusable, the interface must minimize the number of visible targets while allowing the user to intuitively access a maximum or infinite number of targets not in view. Thus in order to accommodate all applications and use cases of the device, while making the interface simple and effective, the selectable targets must be mapped to a virtual solid that can be rotated or otherwise manipulated by eye gaze or fingertip touch to activate the desired command or access the desired content.

This user interface paradigm is in contrast to presently implemented desktop or handheld device interfaces that push relatively large amount of targets and content into the display, and often require the user to use a menu system, such as scroll-down menu system.

In a situation where each eye gaze or touch sensor target more or less approximates a symbol keystroke, this means that for high speed operation, the user interface should be designed to account for these tradeoffs between number of different eye position or fingertip targets, and the average time required to reliably detect eye gaze or finger touch movement or selection of these targets. As a result, in contrast to a normal computer keyboard which may have 50 to 100 different finger positions or keys, the user interface for an eye wearable device will generally have a significantly smaller number of targets.

Although it is not overly difficult to control the device and transmit a limited amount of information using only a few eye gaze positions or fingertip movements, in general to send useful data such as text messages and other complex information, a wide variety of different symbols must be transmitted. Alternatively, the same sort of problem occurs when a user may wish to use an eye wearable device to perform other sophisticated functions. For example a paralyzed or handicapped individual may wish to use a touchpad to control the operation of a powered wheelchair, or even, for example, to use the device to control the operation of a robotic arm attached to the powered wheel chair. This can require a lot of different commands.

The present invention discusses a flexible type of interface and method designed to work within these limitations. Although the method generally shows far fewer different targets or target symbols for the eye to gaze upon (or touch to activate) than does a standard keyboard, the method is designed to be both scalable—that is gracefully go from a very limited number of different targets or symbols to a larger number of targets or symbols, and at the same time sophisticated in that the method allows for a great variety of different symbols and commands to be transmitted using only relatively few different eye gaze or fingertip directions.

Although the invention's user interface may be implemented on a wide variety of different eye wearable devices, in some embodiments, the invention's user interface may be implemented on devices that have an outward appearance resembling standard eyeglasses or sun glasses, such as the devices described in parent application Ser. No. 12/842,315, or larger head-mounted or headphone devices with an eyepiece arm providing the display and integrated touchpad. In some embodiments, the user interface may also be used to control virtual reality Goggles—head mounted display screens where the user may have no see through vision of the outside world. Typically the method will generally be implemented in software, designed to run under one or more microprocessors, on these various types of eye wearable devices.

Here, a method of controlling a head-mountable device for transmitting and receiving information from a human user with at least one eye is disclosed. Note that this eye wearable device will generally have a virtual display and at least one fingertip tracking sensor. The method works by displaying a plurality of visual targets on the virtual display. Generally each visual target will comprise at least a visible element (such as a visible symbol, which will often be a standard letter or number symbol) embedded within an either an eye or fingertip position zone (that is, an eye gaze target area or finger position target area) with an area that is generally equal to the visible element. In other words, each visible element or symbol will generally be presented in the context of a larger eye or fingertip position zone region where a human eye gaze or touch selecting that particular visual element will be considered to be interacting with that particular visual element or symbol, and thus corresponding to an intent to select that particular symbol, much as pressing a key, or hovering over an active element of a screen with a mouse, may be assumed by other computerized systems to constitute user interest or intent to activate or select that particular key or element.

It should be understood that the invention's user interface and method can be implemented on a wide variety of different types of eye gaze or touch sensitive detection and virtual display devices, some head mounted, and some not. In some cases the device may be head mounted, and in other case the device may not be head mounted. Some devices may only monitor one gaze or fingertip of the user, while other devices may monitor the movement and input of either eyes or multiple fingertips. In touch pad or finger pad embodiments, the touchpad may or may not have sensitivity with regard to the fingertip pressure applied, an ability to sense multiple fingertips at the same time (e.g. multi-touch capability, such as using multiple fingertips to control the target size using pinches or other type of gesture.

The device will generally have a display upon which various visual targets, such as symbols, may be displayed in order to give the user something specific to see. Although in this specification, often such displays are shown as see-through virtual displays (because these types of display enable a user to see the surroundings beyond the virtual display), in some embodiments, such as shown in FIG. 1B, the device will utilize a non-see-through type display The device, if configured to monitor eye gaze directions, may monitor eye gaze directions by many methods, including video cameras trained on the eye along with automated image analysis software that interprets eye gaze direction from the visual appearance of the eye. Alternately the device may monitor eye gaze direction by bouncing light off of the surface of the eye and noting the direction of the reflected beam or beams of light, or other means.

Similarly the device, if configured to monitor touch input, may monitor touch input by various methods. In some embodiments, a touch pad or touch sensor, such as a small 2D touch sensor, may be mounted on a frame or other portion of the device. Alternatively the touch pad or touch sensor may be mounted separately from the frame or other portion of the device, and communicate touch commands to the device using short range wireless signals such as Bluetooth signals, or other wired or wireless techniques. The aforementioned separate touch pad may be a virtual target projected by the device to appear in front of the user.

The device will typically be a computer operated device, often including at least one microprocessor, memory, and software to control the visual display. The device will generally take input from at least one of either an eye gaze sensor or touch (fingertip) sensor (and optionally other sensors such as microphones capable of receiving voice commands, accelerometers capable of detecting motion, pitch, yaw and movement, outward pointing cams capable of detecting hand gestures) and convert this input into computer commands for controlling the device and operating the interface. In some embodiments, the device may also correlate the eye gaze direction or touch data with a particular visible element and eye or touch detection position zone associated with this particular visible element on the devices' display.

The device may additionally contain communications devices, such as wired or wireless network connections to communicate to and from other outside devices, cell phone networks, and networks such as the Internet. Note that although in some embodiments, this microprocessor and communications devices may be internal to a device that in turn is mounted on the user's head, in other embodiments, the device may be more of a dumb device, and microprocessor(s) and communications devices may instead be outside of the device, and in some cases connected to the device by a cable.

Figure 1B:
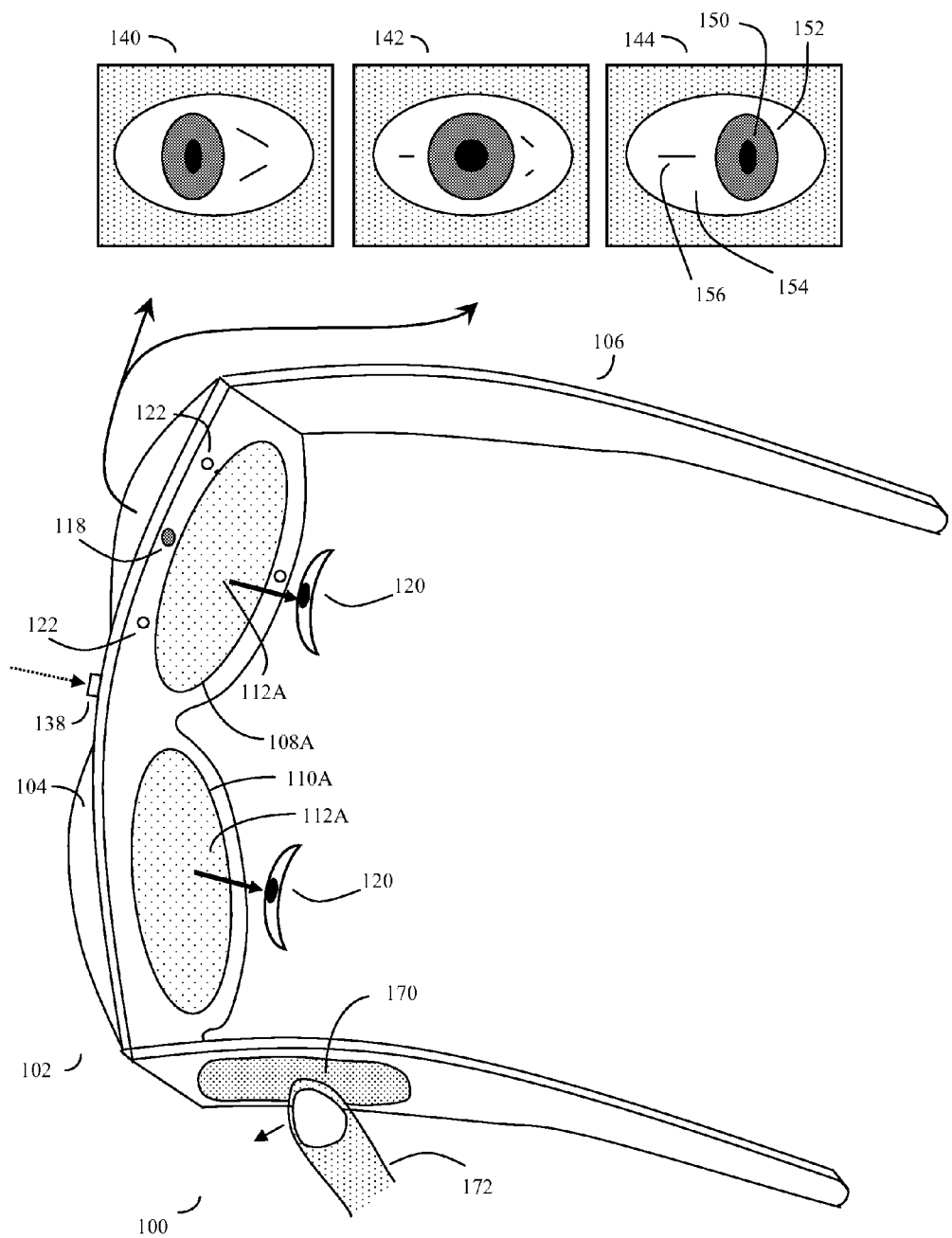
FIG. 1B shows an example of an alternative type of device where either the invention's eye gaze user interface or the invention's touch sensor/touchpad interface may be implemented.

Although the invention's user interface and method can thus be implemented on a wide variety of different eye wearable devices, for purposes of simplicity and ease of understanding, many of the specific examples and illustrations used in this specification will be based on the specific eye gaze or touch controlled device shown in FIG. 1A, which in turn is based on FIGS. 1-3 of parent application Ser. No. 12/842,315.

FIG. 1A shows an overview of one specific example of a device (100) suitable for the invention's user interface and method, here configured to resemble eyeglasses or sunglasses. In this example, the device (100), may be based on a head-mounted or mountable frame (here an eyeglass frame) (102). This head-mounted or mountable frame (102) may be divided into a frame front (104) and two frame temples (106) that extend over or behind the ears to hold the head-mounted frame in place. The frame may have one or usually two lenses, such as eyeglass lenses or sunglasses lenses (108) and (110). Note that if the device is intended for immersive virtual reality applications, there may be no lenses, and instead display screens may completely obscure the user's view of the outside world. Alternatively, the display screen may be positioned slightly above the horizon of the user's natural field of view.

The device will often have an optical system, that may consist of a display (112), a display lens or mirror such as a converging lens or mirror (114), and a beam splitter (116) which may either be mounted on the eyeglass lens (108) or may be held separately.

The device's eye tracking sensor, which may be one or more miniaturized video camera(s) or other types of eye position sensors is shown as (118). One or more eye illumination lights, such as near infrared lights, configured to shine near infrared light onto at least one of the user's eyes (120) is shown as (122).

The device's touch sensor, also termed a touchpad sensor, if present, may be mounted on any region of the device as desired. In FIG. 1, this touch sensor (170) is shown mounted on the temple (106) of the device frame, where it can be conveniently accessed by the user's finger (172). Alternatively the touchpad may be a remote touchpad, not attached to the frame, connecting to the device via a wire or wireless (e.g. Bluetooth) connection.

In operation, display (112) which may be located in the inner portion of the frame temple (106) near the frame front (104) may display a message—for example a brief text message from the user's supervisor such as "What number should I call to reach our client?". The display will show this message. Depending upon the type of display used and environmental conditions, the display may be back lit or illuminated (not shown) to provide better contrast.

In some embodiments, the display will be located too close to the user's eye (120) for the eye to focus on properly. To correct for this, the display may be imaged by a mirror or lens, such as a converging lens (114), to correct the light rays (130) so that they appear to be coming from a more distant virtual object. The light rays then may pass through the beam splitter (116), and into the user's eye (120). The user will see the image of the display and the message as if the display and message were floating in the air in front of the user. At the same time, the user will also be able to see distant objects through the eyeglasses lenses as well. Although only a one eye display is shown in these examples, this optical system may be replicated on the other side of the frame as well, thus allowing both of the user's eyes to see the message.

FIG. 1B shows an alternative embodiment of the invention. Here the display (112A) is mounted along with any lenses (108A, 110A) so that the user does not see the outside environment, but instead sees only whatever is shown on display 112A (which may provide video coverage for both of the user's eyes). This corresponds to a virtual reality headset type device. Here the lenses (108A and 110A) serve only to help the user's eyes focus on the display (112A), and the display in turn blocks visualization of the outside world.

This type of video headset type configuration can use a display system similar to that taught by Robinson in U.S. Pat. No. 5,696,521 (incorporated herein by reference) and others, and popularized by the recent Oculus Rift Virtual Reality Headset. In this context, the methods discussed herein may also be used for various types of virtual reality applications as well, such as movement in a virtual reality world, or operation or manipulation of various aspects of the virtual reality world.

Devices Employing an Eye Tracking Sensor:

In some embodiments, an eye tracking sensor, such as a frame mounted camera (118) can track the motion and gaze direction of the user's eye (120). For example, the user's eye (120) may be illuminated by near infrared light from one or more frame mounted infrared lights (122). The frame mounted video camera (118) which is focused on the user's eye (120) captures images of the eye (120) as the eye gazes in different directions, and looks at different virtual targets presented by the visual display system. Some of the images captured by video camera (118) as the eye (120) looks in different directions are shown as (140), (142) and (144). In (140) the eye is looking to the left, in (142) the eye is looking straight ahead, and in (144) the eye is looking to the right. In many embodiments, the eye tracking sensor will be mounted or coupled directly to the frame. On other embodiments, the eye tracking sensor will not be integrally mounted or coupled to the frame, but may rather be attached and detached from the frame.

In the case where the eye tracking sensor is a video camera (118), this camera can look at a number of different visual elements of the eye. These elements include the relative shape and location of the pupil (150), the iris (152), and sclera (154) of the eye, along with assorted blood vessels (156), and other distinguishing marks on the sclera. In addition to these features, motion of other eye structures, such as the eyelids, blinking rates and patterns, squinting, etc. may also be monitored.

Devices Employing a Touch Sensor:

As can be appreciated, when the touch sensor (170) is mounted on the frame, and the user is attempting to operate the touch sensor in a preferably inconspicuous manner, the user will not be able to control the position of their finger (172) on the touch sensor at all well. There will be a lot of jitter in the touch data. The invention is based, in part, on the insight that the same algorithms used to handle noisy and imprecise eye tracking data can also be used, with only minor modifications, to handle such imprecise touch input data as well.

It should be evident, however that the interface of the present invention will work with many types of eye tracking and touch sensor devices. Thus these specific examples have been given for illustration purposes only, and are not intended to be limiting. The essential elements for the platform itself are that if eye gaze control is desired, the platform should be configured to be able to sense eye gaze angles to within at least about a +/−10 degree field of accuracy. It will often be useful if the platform also presents a real or virtual screen upon which various eye gaze targets corresponds to various eye controlled symbols or "keys", can also be implemented.

If touch sensor control is desired, the platform should be configured to sense the location of the finger over at least one dimensions, and preferably at least two dimensions such as an X, Y plane. The resolution and size of the touch sensor should be preferably configured so that the sensor can distinguish more than two (preferably three or more) distinct fingertip positions on a first axis, and more than three (preferably six or more) distinct fingertip positions on a second axis of the touch sensor or touch pad.

In some embodiments, the eye wearable device may also have one or more cameras, often video cameras oriented to view the outside world (138), often from the point of view of the user. Such cameras, which may also have microphones as well, may be useful for augmented reality applications, as well as to allow the user to discretely photograph his or her surroundings in response to appropriate commands associated with the user interface symbols or targets to operate the camera. Note that here, various regulations may require that the eye wearable device also have a built in speaker to generate an audible sound, such as the sound of a camera shutter or other warning, when camera or camera(s) 138 is used for image, video, or video/audio recording purposes.

One embodiment of a suitable visual display is shown in FIG. 2. Here the user is wearing the device shown in FIG. 1A, and the overall view (200) shows the user's view, as if peering out through glasses. The user is sitting at desk or restaurant table (202) across from another person (204), and the view of the other person and other outside world objects in the upper part of the scene is unobstructed. In the lower part of the scene, the user sees both a view of the outside world, and a view (206) of the display (112) as conveyed to the user's eye by way of correcting lens (114) and beam splitter (116) (here drawn for simplicity as a prism). As previously shown, here the beam splitter is again placed in the lower portion of the field of view, in a manner similar to a bifocal lens arrangement.

In the upper portion of the display (206), the user sees a view of an incoming message, such as a text message (208), which has been received by the device's transceiver. In the lower part of the display, the user is operating either an eye gaze or fingertip based interface to select the letter "O" to form the desired "OK" response to transmit. In this example, various symbols (letters) (210) selectable for transmission move in and out of view as if the letters were rotating on the surface of a virtual wheel (212) or other virtual solid spinning perpendicular to the user. Note that here, this "virtual wheel" is a software construct, generated by executable code, and the use of the "virtual wheel" model is intended to convey in simple terms some of the various functions that the device's display software may employ in the process of generating the visual user interface.

In addition to displaying letters, various control symbols, for example symbols for "space", "backspace", "capital letters", "send", "receive", "next message", "previous message" and the like may also be put on the surface of this virtual wheel (212) and displayed to the user.

In some embodiments, it may be useful to group the letters not in standard alphabetical order, but rather grouped according to frequency of use, so that the most common letters in the user's language of choice are grouped together. For example, for English, the letters used in the highest frequency on average are, in order from most frequently used to least frequently used is: "E T A O I N S H R D L C U M W F G Y P B V K J X Q Z". Thus it may be useful to group the letters by frequency of use so that the user time required to scroll to a particular letter is reduced accordingly. With use, the device might also start to learn what any given user's particular choice of letter use, word use, or other symbol use is, and adjust the position of these letters and symbols on the interface accordingly so as to improve efficiency. Likewise, it may be useful to engage word recognition software after the first letter or two is selected to predict words the user may wish to select, and display those choices on a separate virtual wheel of words. In these examples, however, the letters and numbers are grouped in their normal standard order.

In addition to letters, numbers, and control characters, simple phrases, such as "OK", "Yes", "No", "Busy", "Get back to you soon", and so on, along with various user determined pre-coded messages, may also be encoded as particular symbols, such as user definable function keys Fn. Indeed, such phrases may be pre-encoded along with the appropriate commands to reply to an incoming message and transmit, so that a user need simply glance at the interface or use the touchpad to select a symbol for OK, and the system will know to then respond to any incoming text message with this response. The device may also be programmed append additional explanatory text, such as "sent from an eye wearable device" or the manufacturer's proprietary name for the device, so that the recipient of the return message will have more context about nature of the response.

In one user interface embodiment, the user may select which letters, numbers, or control symbols to use by either gazing at or fingertip activating left rotate (212) and right rotate (214) control targets, which may control the order in which the letters are displayed by, for example, rotating the virtual wheel (212) in either direction by, for example, swiping the fingertip one way or the other, or selecting flywheels with different character sets by swiping up or down. The user can then select the desired letters numbers, or control symbols by either gazing at or tapping a touchpad (touch sensor) when the desired letter, number, or control symbol are rotated into position for selection.

Many other alternative embodiments are possible. In one alternative embodiment, the virtual wheel (212) used to determine the order in which letters, symbols and control elements or symbols are displayed can be a virtual sphere, and the user can rotate this sphere around more than one axis by appropriate eye gaze or fingertip touch sensor actions. In another alternative environment, more than one type of virtual wheel (212) may be used, for example one for the alphabet, one for word prediction, one for numbers, one for control commands, one to speed dial frequent contacts, to further enhance the speed and flexibility of the interface.

Here some of these alternative user interface embodiments will be discussed in more detail.

In this discussion, the various regions of the display that can be activated when a user eye gaze exceeds a preset limit of time, or by fingertip commands on a touch sensor, are referred to as "keys". Although it should be understood that these "keys" are in fact simply controlled by sensor determination of eye angles or fingertip touch on a touch sensor in relationship to a virtual target projected by an eyeglasses mounted display, for simplicity, often it is useful to use the term "keys" because this term rapidly conveys the concept of the actions that may follow once the user's eye gazes at the appropriate visual target for a predetermined length of time, or when the user's finger touches an appropriate place on a touch sensor. In one embodiment by tapping after that target is brought into the key region by swiping the fingertip on a touchpad to rotate the virtual surface.

In this discussion, in the touch controlled embodiment, the physical surface of the touchpad can be used by the system to track fingertip movements either independently of the virtual surface of the display, or the touch sensor/touchpad can be programmed to mirror key regions on the display. The eyeglasses are assumed to cover a 45 degree wide angle from side to side, and a 30 degree angle from top to bottom. It should be understood, however, that these particular values are simply for purposes of conveying a specific example of the invention's user interface.

FIG. 3 shows an overview of the invention's eye control method. The interface generally follows the "virtual wheel" or virtual "cylinder" (or other virtual surface) software construct previously shown in FIG. 2 and in parent application Ser. No. 12/842,315, the contents of which are incorporated herein by reference.

In this scheme, the visual targets (300) may be composed of visible elements such as letters of the alphabet, numbers, punctuation symbols, system controls, and user defined keys, which are mapped into various rows and columns on the surface of a virtual solid such as a virtual cylinder (212).

A small window (314) from this virtual solid (312) is in turn shown on a corresponding window (316) on the virtual display (306) at any given time. Here the virtual display (306) corresponds to the display (206) previously shown in FIG. 2.

Around each visible element (302) is an eye or fingertip position zone (304) that defines the region where a user's eye or eye's or finger may gaze at or touch, and even wander a bit, but if the user's eye generally remains within this zone for a sufficient amount of time (such as at least a hovering time interval) or the user's fingertip taps the touch sensor the system to trigger an execution command associated with that visible element in that zone. This eye or finger position zone may roughly correspond to the angular region (in degrees) in which the eye gaze direction is located, or alternatively a range of positions on the touchpad where the target can be accurately "touched" for a particular user on a particular device.

In some embodiments, the touchpad (touch pad) surface may not be attached directly to the device, but rather be remote from the device, and be operated more independently to control the device in a manner uncoupled from the display's virtual surface. Thus, depending upon the limitations of the particular platform upon which the method and user interface is implemented, the position of the touchpad can be optimized to control the eye wearable device. The detached touchpad may also be a virtual touchpad projected by the device's beam splitter and display to appear in 3D space in front of the user. In this embodiment, the device may detect by outward-pointed cameras or sensors when the user controls the virtual touchpad by tapping, swiping or similar gestures.

In some embodiments, the virtual solid or virtual cylinder, or other virtual surface (212) may contain only one row of virtual targets, and this type of embodiment was previously shown in FIG. 2 (212). However in order to implement still more virtual targets or virtual keys, often it will be convenient to have an embodiment with multiple rows of virtual targets, as is shown in FIG. 3 (312).

In order to shift between rows, a defined key, such as an up-arrow key ˆ (307), may be used to move the focal point of the interface (316) to different rows of the cylinder. Thus by selecting the up arrow key ˆ, the user could transition between a display of letters (row 2) (308) and a display of numbers (row 1) (312), or a display of user defined function keys (row 4) (320), or a display of punctuation symbols (row 3) (322). The user may rotate the virtual cylinder to the right or left by selecting appropriate left < and right > direction keys (324), (326).

Each row of the cylinder may additionally have one or more keys F(a), F(b) . . . F(n) (328) (abbreviated Fa, Fb, Fn) that remain constantly displayed on display (306) regardless of the rotation of the virtual cylinder (312). These constant Fn keys can be conveniently used to control frequently used controls, such as space, shift (capital letters to small letters), backspace, and display on/off.

To simplify the user interface, the letters may follow a standard convention, such as a presumption that the letters are always to be lower case except at the beginning of a sentence. Since the space character is generally more highly used in writing than the shift key, it may be convenient to associate the letter row Fn button with a space bar (330), and place the shift key (332) in another row.

The interface may be designed to allow the user to redefine keys according to personal tastes, of course.

Note that although, for simplicity, the virtual surface and virtual solid will often be spoken of as a virtual cylinder, which somewhat implies that different rows of symbols on the surface of the virtual cylinder may have the same number of symbols and same amount of spacing, in fact this does not have to be the case. In some embodiments, the virtual solid can be configured like a sphere or other surface of revolution with some rows having a more symbols than others. Likewise there is no requirement that the solid be smooth—virtual cubes, triangles, and or irregular shapes may also be used. Indeed, there is no requirement that the virtual surface be on any virtual solid at all, and thus in some embodiments, the virtual surface may be considered to be like a sheet of paper that may be curved, or even irregularly shaped.

Figure 4:
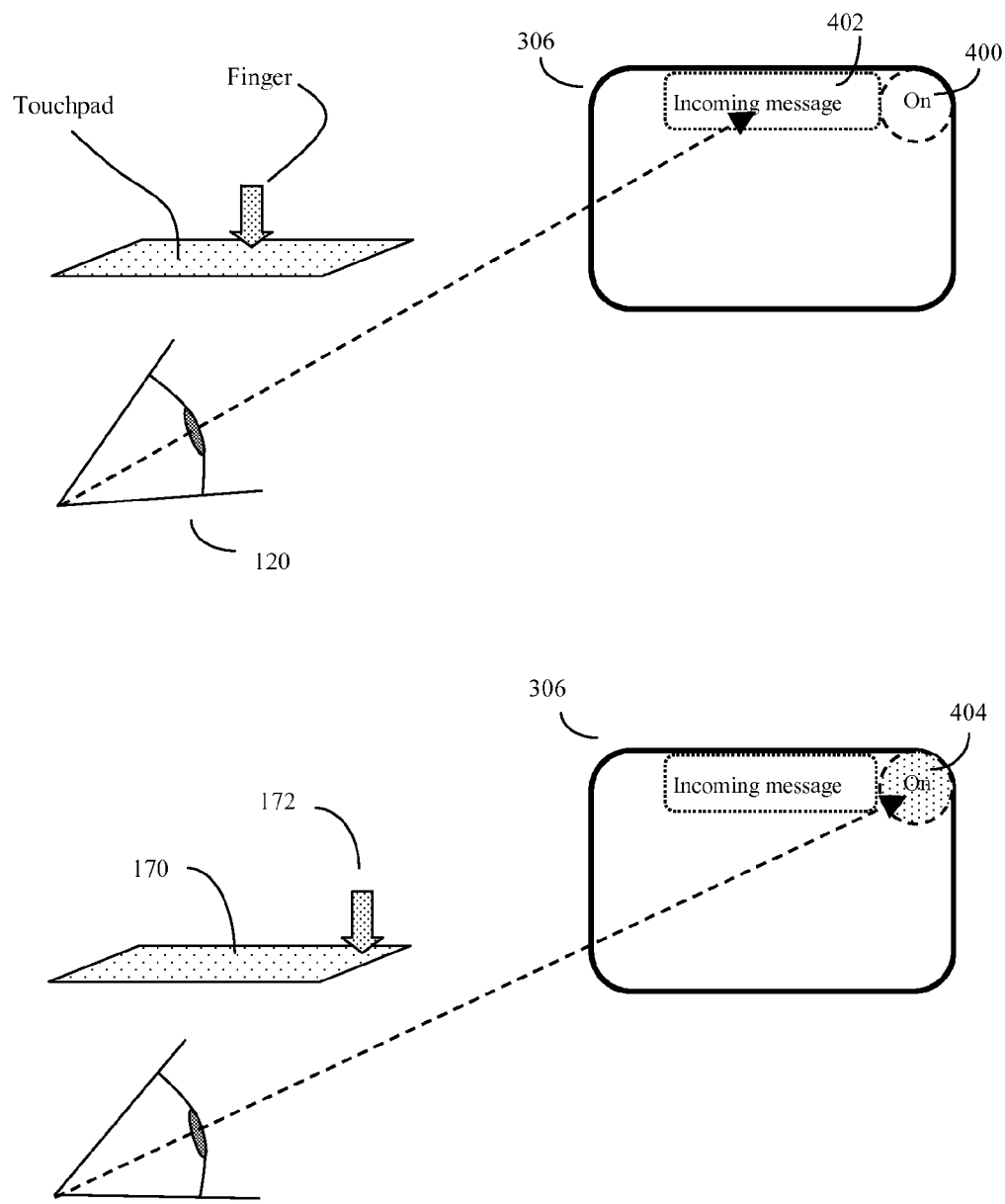
FIG. 4 shows an example of the user interface in action.

FIG. 4 shows an example of the user interface in action. Here the system, when not in use, may generally be in a "standby mode" in which at most only a small section of the display, such as an "On" key located off to one corner (400), is sensitive to user eye position. This will allow the user to move his or her eyes in a generally normal manner, regarding the outside scene, when the device is not being used to transmit data.

In FIG. 4, from standby mode, the system may receive an incoming text message (402) or other system alert, and may display this message in one part of the display. The user may decide to read this message without necessarily responding to the message. However if the user decides to respond to the message, the user may turn the system from standby mode to a full "On" mode by gazing at the "On" key or touching the touchpad in a way associated with the "On" key (400). In FIG. 4 and subsequent figures, the touchpad or touchpad (170) and the position of the user's finger (172) on the touchpad or finger pad is also shown. See FIG. 1A or 1B for further context.

In one eye gaze interface embodiment, if the user glances at the "On" key for a first transient period of time T1, then the "On" key will not respond. If the user glances at the "On" key for a longer period T2, then the "On" key will become highlighted (404) or otherwise let the user know that the key is about to be activated. At this point, the user may either glance away from the key, or alternatively, if the user continues to glance at the key for a still longer period of time T3, the key will be considered to be activated or "pressed", and in this example the system will go a full active mode. This same T1, T2, T3 scheme will also be used for the other eye gaze controlled "keys" in this example.

FIG. 5 shows the user interface in full active mode. In active mode, more display elements are active, and the display generally will be sensitive to a much broader range of eye gaze or fingertip commands. In FIG. 5, the user has started to send an outgoing message by first selecting the appropriate row using the up-arrow ˆ key appropriate eye gaze, or by swiping or dragging the fingertip up or down on the touchpad (307), and then selecting the appropriate column using the left < and right > keys, or again by swiping or dragging the fingertip side-to-side on the touchpad (324), (326). Here the user is in the process of activating the first letter of his response, which in this example is a capital "O" because this is the beginning of a sentence. This first letter O is shown in the outgoing message box at the bottom of the display.

Once the user has selected the first letter, the user can then select the second letter (here the next letter will be a "u") by gazing at the right > key (326) or by swiping or dragging the fingertip in the appropriate direction on the touchpad, causing the virtual cylinder to rotate so that the letter "u" is now in the center position. In FIG. 5, the virtual cylinder is still in the process of rotating, so that a non-desired letter "t" is presently in the center position. So the user must continue to rotate the cylinder by continuing to select the right > key (326).

In FIG. 6, the desired letter "u" is now in the center position, and the user has just selected it by either gazing at it for a T3 length of time (600), or by tapping the touchpad. The outgoing message is starting to be constructed in the outgoing message box (500), and this can be seen as the letters "Ou".

In FIG. 6 bottom, this process has continued, and the user has just finished constructing the first word "Outgoing" (602). The user is now in the process of indicating a space by either gazing at the Fn button (328), which for this row of the virtual cylinder has been assigned to correspond to a spacebar key, or else appropriately tapping the touchpad as indicated.

Figure 7:
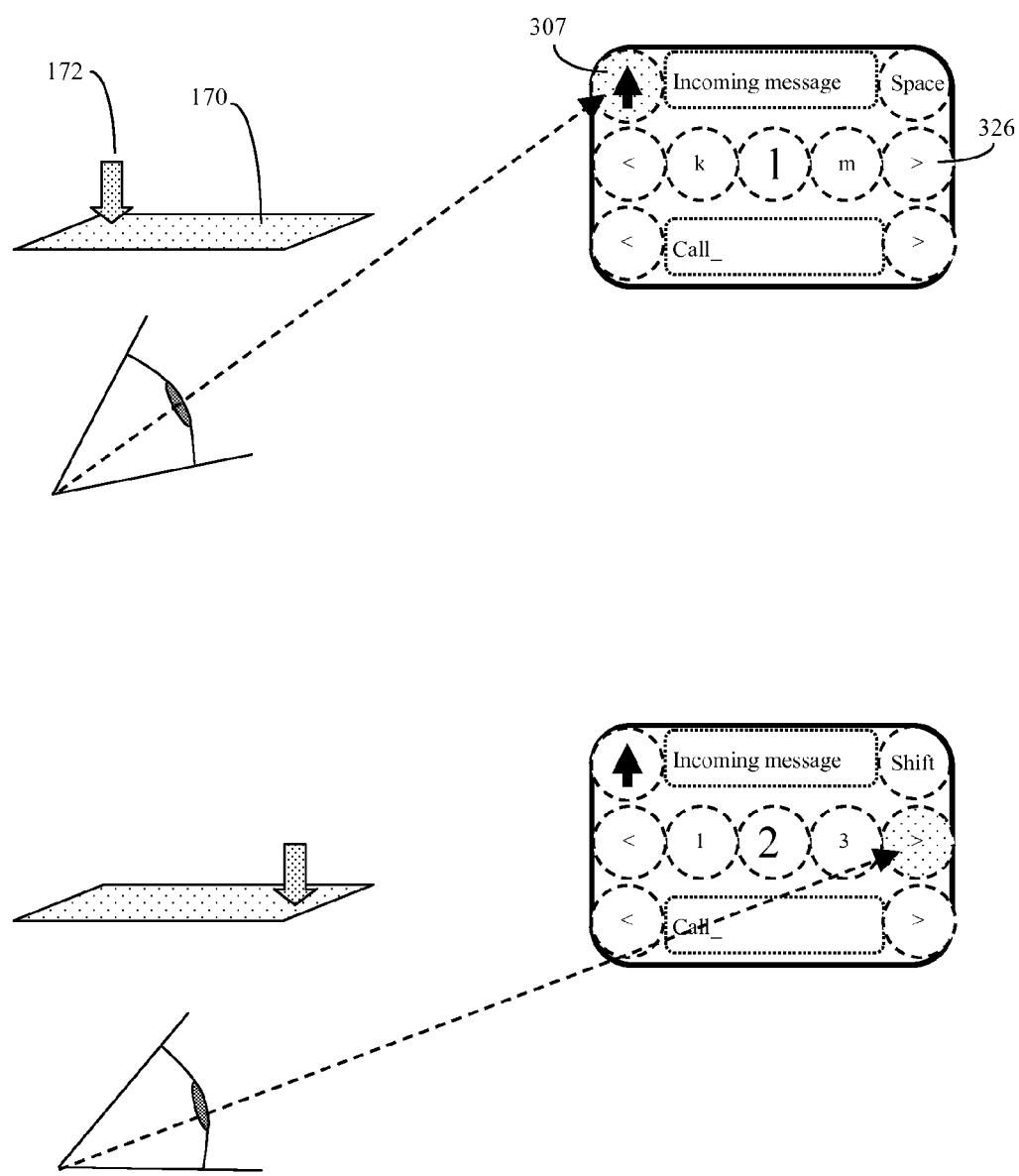
FIG. 7 shows a user generating a different outgoing message involving numbers.

In FIG. 7, the user is now trying to send a different message, which is for a co-worker to call a certain phone number. Here the user has finished constructing the first word of the message, which is "Call", and now the user wishes to start entering numbers, which are located on a different virtual row of the virtual cylinder. Here the user can tell the system to shift to a different virtual row by gazing at the up arrow button ˆ (307) for a T3 length of time or again wiping or dragging the fingertip (172) up or down on the touchpad (170).

In FIG. 7 bottom, the user has successfully transitioned to the number virtual row of the virtual cylinder (310), and is now moving the virtual cylinder to find the desired first digit of the phone number by either gazing at the right > (326) key or again swiping or dragging the fingertip laterally along the touchpad.

Figure 8:
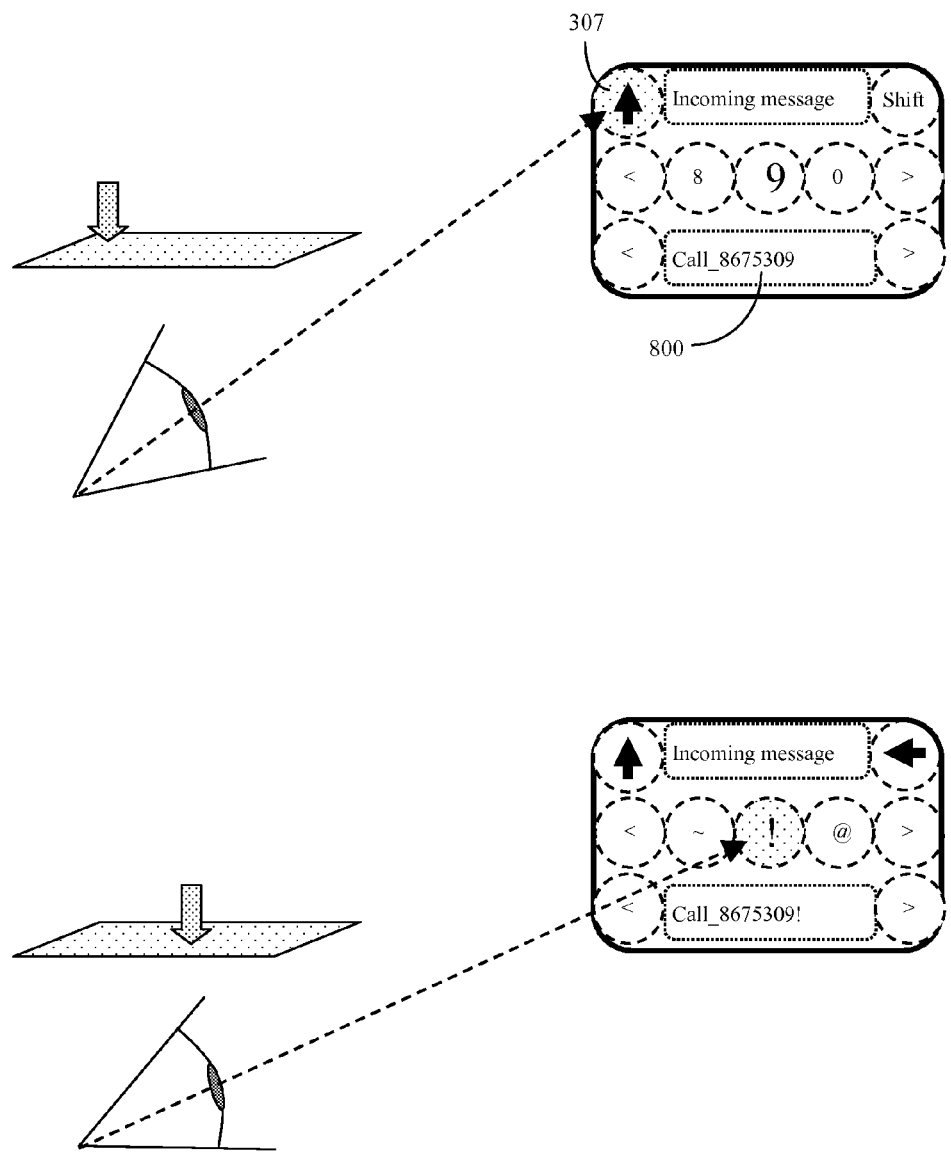
FIG. 8 shows a user now generating a punctuation symbol for an outgoing message.

In FIG. 8 top, the user has finished constructing the phone number, and now wishes to indicate to the co-worker that the message is urgent by appending a "!" to the end of the message. Punctuation may be on yet another virtual row of the virtual cylinder, so here the user may shift to the punctuation virtual row by again either or swiping down, i.e., dragging the finger down on the touchpad, thereby moving the virtual cylinder downward to bring the above row into place for target selection In FIG. 8 bottom, the user has now moved to the punctuation virtual row (322), and has selected the desired "!" symbol by either gazing at it or bringing it into the appropriate position and tapping on the touchpad, and now the outgoing message, "Call 8675309!" is complete (800).

In FIG. 9, the user wishes to send the response back to the originator of the last text message to him, but also wishes to also send a copy to his boss. In this example, the user may have predefined a user key, such as F2, to be: "Send response back to last text message, cc boss's cell phone number". To achieve this goal, the user again either gazes at the up arrow key ˆ (307) or alternatively swipes or drags the fingertip down on the touchpad to select the user defined function row. Here the user defined function row may be an intelligent row (320) of function keys that might select the most commonly used user defined option automatically.

The user can then easily send the text message back to the originator of the earlier text message, with a cc to his boss, by selecting, for example, the previously user defined F2 key (900). The system can in turn both remind the user of the function of the F2 key, as well as confirm when the message has been properly transmitted, by sending appropriate messages to the incoming message box (402).

In FIG. 10, the user may want to control a function that is entirely unrelated to text messaging. For example, the user may be a disabled person desiring to operate an advanced powered wheelchair accessory, such as a robotic arm, in order to pick up a nearby object. Here, the user may have, for example, previously defined the user definable F8 key to be a key that moves the robotic arm five degrees to the left.

In FIG. 10 top, the user again gazes at the right key > (328) or alternatively swipe right or left by dragging the fingertip laterally upon the touchpad to select the appropriate user defined function key, and the system reminds the user about the function of this key in the upper message box. Here, for example, the system is reminding the user that the F8 key was previously assigned the function to "Move arm left 5 deg."

In FIG. 10 bottom, the user has then moved the robotic arm left by selecting the F8 key, and the system has confirmed that the "Move arm left" command was sent by displaying a "Moved left 5 degrees" message in the upper message box (402).

Figure 11:
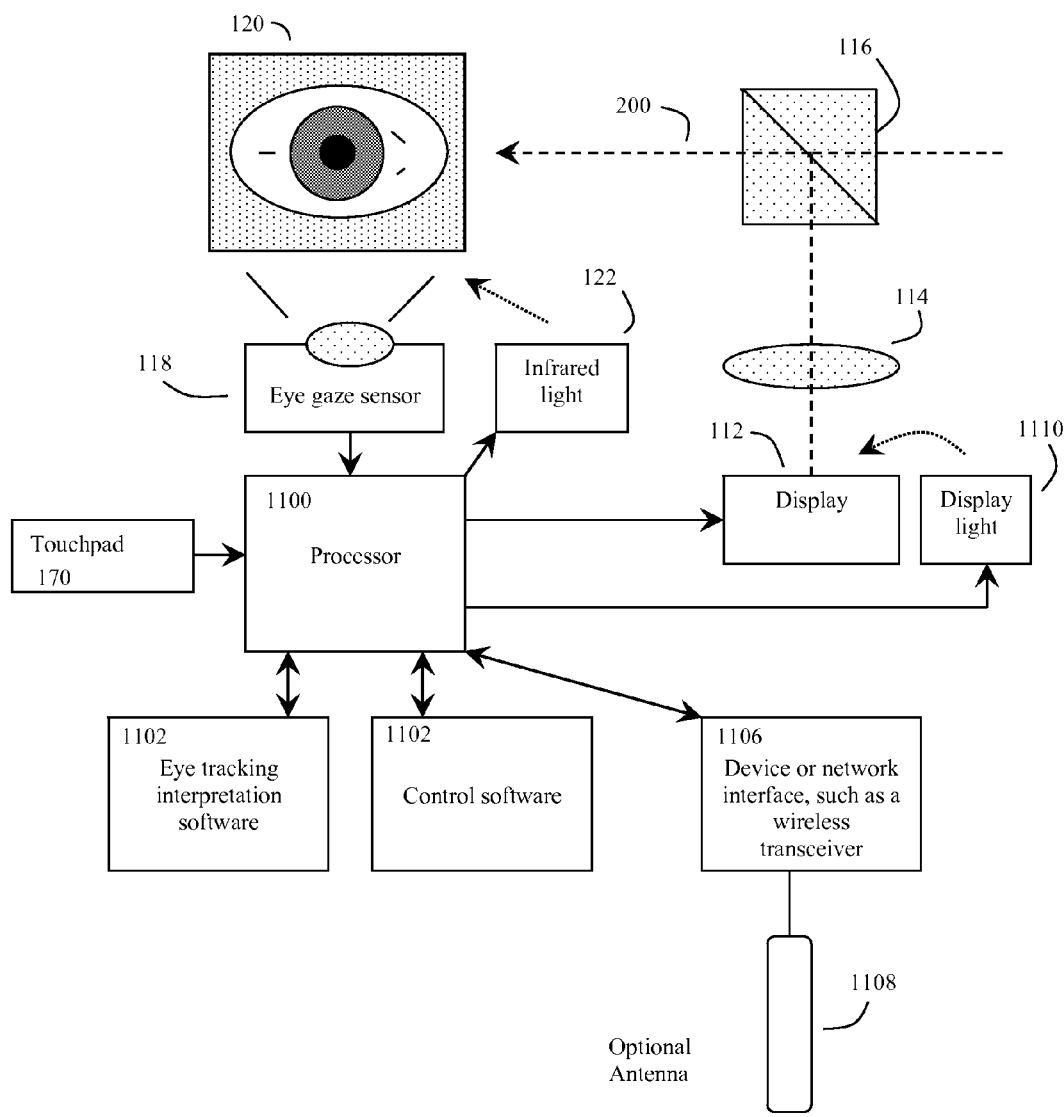
FIG. 11 shows one example of the electrical circuitry and software that may be used to implement the present invention's eye gaze or touchpad user interface and method

FIG. 11 shows an example of the electrical and optical circuitry that may be used to implement either the eye gaze version or the touch sensor version of the invention's user interface method. Often the user interface and method will be implemented in the form of software designed to run on one or more processors (1100), which may be microprocessors, possibly assisted, supplemented, or supplanted by one or more digital signal processors (DSP). The processor(s) in turn executes code or software, such as general control software (1102) and at least one of eye gaze tracking or touchpad interpretation software (1104) intended to analyze input data of either the eye returned from the eye position sensors (118) or the finger input on the touch sensor (170), and determine from this data information pertaining to the user's intention, which may be conveyed by various eye movements, or by tapping, double- or triple-tapping, scrolling, swiping, performing these actions with more than one finger, pinching fingers together or expanding the fingers apart, or using part of the hand or an instrument other than fingers on the touch sensor (170).

Although some embodiments of the invention may use only the eye gaze input, or only the touch sensor input, in some embodiments, the device may have both eye gaze and touch sensor input, and allow either of the two or both to be used for control purposes. Here there are some advantages to using both, because touch sensing may be used when a high degree of control is desired, and eye gaze sensing may be used when the user wishes to operate the device more inconspicuously, for example. Alternatively if the device is to be used by handicapped individuals, dual controls may enable a caretaker to quickly configure the device using the touch sensor, and then the handicapped individual can then use the eye gaze commands after initial configuration.

The processor(s) (1100) may operate one or more types of device or network interfaces, including wired or wireless transceivers (1106), which in turn may be connected to an optional antenna (1108) or wire connection which may be optionally incorporated or embedded into the head-mounted frame, such as the eyeglasses frame. The processor will also send data to a display (112) for creating a real or virtual display for viewing by the user. This may be done through optical system lens components (114) and beam splitter components (116) or by other display methods as desired. The beam splitter (116) may be implemented in various ways, including a semi-reflective and partially transmissive thin tilted plate of glass or plastic, cube beam splitter, prism design, or other optical configuration. The processor may optionally control a display illumination light (1110) to improve display visibility as needed.

Thus in some embodiments, additional sensors may also be used. For example the device may use voice recognition capability, gyroscope accelerometers, retinal scanning or eye gaze sensors (118) so that other methods of controlling the device may be used in tandem with fingertip control. For eye-gaze control, for example, one of these methods include the methods of Oyewole Oyekoya, "*Eye Tracking, A Perceptual Interface for Content Based Image Retrieval*", Ph.D. Thesis 2007, Department of Electronic & Electrical Engineering, Adastral Park Campus, University Park London. Alternative methods include the methods of Selker et. al., "*Eye-R, a glasses mounted-eye motion detection interface*", Conference on Human Factors in Computing Systems, CHI '01 extended abstracts on Human factors in computing systems, pages 179-180, and other methods. Further discussion regarding the eye gaze embodiment of the invention The human eye has a number of visible sub-structures, such as the pupil, iris, and sclera, which artificial vision software can use to track the eye, and determine where the eye is pointing or gazing at any given moment of time. However, as previously discussed, using the gaze of the eye to control devices is complicated by the fact that the position of the eye is constantly shifting. The human eye does not gaze at objects of interest in a steady uniform manner, but rather scans objects of interest by a series of saccades or rapid eye movements. In this respect, the human eye acts much like a cross between a camera and a scanner, and indeed this scanning motion helps make up for the inherent deficiencies and limitations of the eye in terms of its performance as a natural camera.

In order to compensate for this constant movement, the eye tracking software and processor must take this natural constant saccade movement into account. Here other workers in the field, such as Oyekoya, have shown that when such constant movement is compensated for, eye gaze can be an effective way to understand user intentions, and in fact in some situations eye gaze can even select objects of interest faster than alternative user interfaces, such as computer mice.

The automated interpretation of human eye gazing is facilitated if the automated interpretation system knows the location of the objects of interest or targets that the eye is likely to be gazing upon. The automated system can then use its knowledge about the location of these targets, often called salient images, to help interpret the series of eye movements as detected by the artificial vision software. Here this target information is known because the invention is displaying these targets in specific locations in the invention's display (112).

Here the eye tracking software may operate by first storing in memory the location of various visual display targets, such as symbol targets and control targets that the system is displaying on display (112). The software may then process eye movement data and attempt to determine which target the eye is gazing on by, for example making use of algorithms such as the Oyekoya eye gaze interpretation software algorithms. These algorithms include steps such as determining if the eye is revisiting on particular target regions, and determining if the eye has a tendency to visit the target region just prior to the main incidence of target fixation. The speed of the eye saccade may also be used to give relevant information, because saccade speeds tend to slow down right before the target image of interest is selected. Other methods include determining changes in eye pupil diameter, because pupil diameter can tend to change when the eye is gazing upon an intended target region. Dwell time on the target may also be used because this also gives important information that the eye is fixing on a particular target.

The eye tracking software will often also use various statistical methods, such as Analysis of Variance (ANOVA) to analyze the eye tracking data, as well as to calibrate itself to the individual characteristics of any given user.

Many different types of visual interfaces may be used to control the device. One example of such a visual interface is taught by the methods of Kozma et. al., "GaZIR: Gaze-based Zooming Interface for Image Retrieval", ICMI-MLMI 2009, 2-6 Nov. 2009, Cambridge, Mass., USA, or other method. The GaZIR interface utilizes a gaze based zooming interface to allow the user to progressively zoom in on targets of interest by continuing to gaze at them. Here for example, the interface controls the speed of appearance of new letters based upon information determined by the user's gaze. Other methods may also be used.

Note that as previously discussed, often the user fingertip (172) touches on the fingertip sensor (170) will also be subject a similar type of noise and imprecision. Thus at least some of these techniques may also be useful for processing the touch sensor input data as well.

Further Discussion

Expressed alternatively, the invention may be viewed as a system, device, or method of controlling a head-mountable, vision-controlled, device for transmitting and receiving information from a human user with at least one eye. This device will comprise a frame configured to attach to the head of a user, as well as display or virtual display and connectivity to at least one touchpad.

In a preferred embodiment, the connectivity to at least one touchpad is achieved by physically connecting the at least one touchpad to said frame, thereby becoming a head mounted touchpad as is shown in FIGS. 1A and 1B (170). Alternatively, however, connectivity to at least one touchpad may be achieved by at least one touchpad that is not physically attached to the frame, but which instead uses a wireless or wired connection to transmit touch data to the device processor.

The device processor (FIG. 11 1100) can be configured (usually by suitable software) to display a plurality of visual targets on the real or virtual display. this plurality of visual targets each comprising a visual element area (FIG. 3 302) embedded within a visual element position zone (FIG. 3 304) with an area that is equal to or larger than the visual element, each visual element area and visual element position zone mapping to a touch sensitive touch element on a touchpad position zone (170).

The device, system, and/or method can thus use the at least one touchpad (170) to determine when at least one user touch is on average touching an area that is within a visual element position zone (304) of at least one of the plurality of visual element areas, for a time period exceeding a hovering time interval, thus signaling when this hovering time interval has been exceeded. The processor (1100) can then use the at least one touchpad (170) to register that a virtual key corresponding to said at least one of said plurality of visual targets has been pressed by said user, and use such virtual key presses to control either transmitting or receiving information.

Here, the process of registering that a virtual key corresponding to a given visual target has been pressed can be done in more than one way. For example, if the user touch remains within the visual element position zone any given visual elements for a time period exceeding a keypress time interval, then the device processor can register that a virtual key corresponding to this particular individual element has been pressed by the user.

Alternatively, the device can be configured so that if the user subsequently uses touch methods (e.g. a fingertip touch) to tap within the visual element position zone of a given visual element, then the device will this touchpad tap to register that a virtual key corresponding to a given at visual targets has been pressed by the user.

The invention claimed is:

1. A method of controlling a head-mountable device for transmitting and receiving information from a human user with at least one eye, said device having a virtual display, at least one eye position tracking sensor, and connectivity to at least one touchpad;
   said device comprising a frame configured to attach to the head of a user;
   wherein said connectivity to at least one touchpad is achieved by physically connecting said at least one touchpad to said frame, thereby becoming a head mounted touchpad, said method comprising:
   using at least one processor to display a plurality of visual targets on said virtual display, said plurality of visual targets each comprising a visual element area embedded within a visual element position zone with an area that is equal to or larger than said visual element area, thus producing a plurality of visual element areas, each visual element area and visual element position zone mapping to a touch sensitive touch element on a touchpad position zone;
   wherein at least some of said plurality of visual targets further comprise a visual element embedded within an eye position zone with an area that is equal to or larger than said visual element;
   using any of said at least one touchpad or said at least one eye position tracking sensor to register that a virtual key corresponding to said at least one of said plurality of visual targets has been pressed by said user by using said at least one eye position tracking sensor to determine when said at least one eye is on average continuously gazing in a direction that is within an eye position zone of at least one of said plurality of visual elements for a time period exceeding a hovering time interval, signaling when said hovering time interval has been exceeded, and if said gaze remains within the eye position zone of said at least one of said plurality of visual elements, without looking away, for a time period exceeding a keypress time interval, also registering that an eye gaze controlled virtual key corresponding to said at least one of said plurality of visual targets has been pressed by said user; and
   using said virtual key presses to control either transmitting or receiving said information to at least one computerized device outside of said head-mountable device's said frame.

2. The method of claim 1, further using said at least one touchpad to determine when at least one user touch is on average touching an area that is within a visual element position zone of at least one of said plurality of visual element area for a time period exceeding a hovering time interval, and signaling when said hovering time interval has been exceeded, prior to using said at least one touchpad to register that the virtual key corresponding to said at least one of said plurality of visual targets has been pressed by said user.

3. The method of claim 2, wherein said signaling comprises signaling methods selected from the group consisting of changing a visual appearance of said visual target, changing a visual appearance of a different visual portion of said virtual display, creating sounds, or creating inaudible or tactile vibrations; and if at least one user touch remains within said visual element position zone of said at least one of said plurality of visual elements for a time period exceeding a keypress time interval, then using said at least one touchpad to register that a virtual key corresponding to said at least one of said plurality of visual targets has been pressed by said user; or if said user taps said touchpad within said visual element position of said at least one of said plurality of visual elements, then further using said processor to register that a virtual key corresponding to said at least one of said plurality of visual targets has been pressed by said user.

4. The method of claim 1, further creating a user interface comprising at least a surface of a virtual solid, and disposing at least three or more of said plurality of visual targets across said surface;

displaying at least three different visual elements from at least three different visual targets from said user interface on said virtual display, producing displayed virtual solid visual targets; and determining when a virtual key corresponding to said at least one of said displayed virtual solid visual targets has been pressed by said user.

5. The method of claim 4, further displaying at least one rotation visual target that is configured so that a keypress on said rotation visual target causes said virtual solid to virtually rotate about a first virtual axis of rotation, thereby suppressing display of at least one previously displayed virtual solid visual targets, and causing at least one new displayed virtual solid visual target to now be displayed on said virtual display.

6. The method of claim 5 wherein said virtual solid visual targets are disposed in at least one row circling an outer circumference of said virtual solid.

7. The method of claim 6, wherein said virtual solid visual targets are disposed in more than one row circling said outer circumference of said virtual solid; and further displaying at least one shift virtual solid visual target, configured so that a keypress on said shift virtual solid visual target causes said visual targets from a different row of said virtual solid to become displayed virtual solid visual targets.

8. The method of claim 5, wherein said at least one touchpad is a multi-touch touchpad configured to recognize simultaneous touches on at least two different portions of a same touchpad to further control the display of said rotation visual target to at least rotate about said first virtual axis of rotation, or to control an apparent size of said virtual solid virtual target on said virtual display by any of a swiping, pinching, or double-tapping process.

9. The method of claim 1, wherein said device has at least a standby mode and an active mode, wherein when said device is in a standby mode, more than 50% of the area of said virtual display will not be sensitive to the gazing direction of said at least one eye, but at least some of the area of said visual display will remain sensitive to the gazing direction of said at least one eye, thus enabling said user to more freely gaze at outside objects not displayed on said virtual display.

10. The method of claim 1, wherein said display, mounted in said device's said frame, further comprises at least one transparent lens or other transparent device to allow visual information from an outside environment to also be seen by at least one eye of said user.

11. The method of claim 1, wherein said frame comprises frame portions that extend over or behind the ears of said human user, and wherein said frame portions are configured to mount and hold said frame in place on said human user's head.

12. The method of claim 1, wherein said virtual key is associated with information comprising at least one symbol, and wherein transmitting said information comprises transmitting said at least one symbol.

13. A method of controlling a head-mountable, vision-controlled, device for transmitting and receiving information from a human user with at least one eye, said device having a virtual display, at least one eye position tracking sensor, and connectivity to at least one touchpad;

said device comprising a frame configured to attach to the head of a user;

wherein said connectivity to at least one touchpad is achieved by physically connecting said at least one touchpad to said frame, thereby becoming a head mounted touchpad, or wherein connectivity to at least one hardware or virtual touchpad is achieved by a wireless or wired connection to at least one touchpad not physically attached to said frame; said method comprising:

using at least one processor to display a plurality of visual targets on said virtual display, said plurality of visual targets each comprising a visual element area embedded within a visual element position zone with an area that is equal to or larger than said visual element area, thus producing a plurality of visual element areas, each visual element area and visual element position zone mapping to a touch sensitive touch element on a hardware or virtual touchpad position zone;

using said at least one touchpad to determine when at least one user touch is on average touching an area that is within a visual element position zone of at least one of said plurality of visual element area for a time period exceeding a hovering time interval, signaling when said hovering time interval has been exceeded, then using said at least one touchpad to register that a virtual key corresponding to said at least one of said plurality of visual targets has been pressed by said user;

wherein at least some of said plurality of visual targets further comprise a visual element embedded within an eye position zone with an area that is equal to or larger than said visual element area;

further using said at least one eye position tracking sensor to determine when said at least one eye is on average gazing in a direction that is within an eye position zone of at least one of said plurality of visual elements for a time period exceeding a hovering time interval, signaling when said hovering time interval associated with said gaze has been exceeded, and if said gaze remains within the eye position zone of said at least one of said plurality of visual elements, without looking away, for a time period exceeding a keypress time interval, also registering that a virtual key corresponding to said at least one of said plurality of visual targets has been pressed by said user; and using said virtual key presses to control either transmitting or receiving said information to at least one computerized device outside of said head-mountable device's said frame.

14. The method of claim 13, wherein any of either signaling when said hovering time interval associated with said gaze has been exceeded, or signaling when said hovering time interval associated with said touch has been exceeded, comprises signaling methods selected from the group consisting of changing a visual appearance of said visual target, changing a visual appearance of a different visual portion of said virtual display, creating sounds, or creating inaudible or tactile vibrations; and
  if said at least one user touch remains within said visual element position zone of said at least one of said plurality of visual elements, without leaving, for a time period exceeding a keypress time interval, then using said at least one touchpad to register that a virtual key corresponding to said at least one of said plurality of visual targets has been pressed by said user; or
    if said user taps said touchpad within said visual element position of said at least one of said plurality of visual elements, then further using said processor to register that a virtual key corresponding to said at least one of said plurality of visual targets has been pressed by said user.

15. The method of claim 13, further creating a user interface comprising at least a surface of a virtual solid, and disposing at least three or more of said plurality of visual targets across said surface;
  displaying at least three different visual elements from at least three different visual targets from said user interface on said virtual display, producing displayed virtual solid visual targets; and
  determining when a virtual key corresponding to said at least one of said displayed virtual solid visual targets has been pressed by said user;
  further displaying at least one rotation visual target that is configured so that a keypress on said rotation visual target causes said virtual solid to virtually rotate about a first virtual axis of rotation, thereby suppressing display of at least one previously displayed virtual solid visual targets, and causing at least one new displayed virtual solid visual target to now be displayed on said virtual display;
  wherein said virtual solid visual targets are disposed in at least one row circling an outer circumference of said virtual solid.

16. The method of claim 15, wherein said at least one touchpad is a multi-touch touchpad configured to recognize simultaneous touches on at least two different portions of a same touchpad to further control the display of said rotation visual target to at least rotate about said first virtual axis of rotation, or to control an apparent size of said virtual solid virtual target on said virtual display by any of a swiping, pinching, or double-tapping process.

17. The method of claim 13, wherein said device has at least a standby mode and an active mode, wherein when said device is in a standby mode, more than 50% of the area of said virtual display will not be sensitive to the gazing direction of said at least one eye, but at least some of the area of said visual display will remain sensitive to the gazing direction of said at least one eye, thus enabling said user to more freely gaze at outside objects not displayed on said virtual display.

18. The method of claim 13, wherein said display, mounted in said device's said frame, further comprises at least one transparent lens or other transparent device to allow visual information from an outside environment to also be seen by at least one eye of said user.

19. A head-mountable device for transmitting and receiving information from a human user with at least one eye, said device having a virtual display, at least one eye position tracking sensor, at least one processor, and connectivity to at least one touchpad;
  said device further comprising a frame configured to attach to the head of a user;
  said display, mounted in said device's said frame, further comprising at least one transparent lens or other transparent device to allow visual information from an outside environment to also be seen by at least one eye of said user;
  wherein said connectivity to at least one touchpad is achieved by a touchpad that is physically attached to said frame, thereby forming a head mounted touchpad;
  said device further comprising:
  at least one processor configured to display a plurality of visual targets on said virtual display, said plurality of visual targets each comprising a visual element area embedded within a visual element position zone with an area that is equal to or larger than said visual element area, thus producing a plurality of visual element areas, each visual element area and visual element position zone mapping to a touch sensitive touch element on a touchpad position zone;
  said at least one processor also configured to associate at least some of said plurality of visual targets with a visual element embedded within an eye position zone with an area that is equal to or larger than said visual element area;
  said at least one processor configured to accept input from any of said at least one touchpad and said at least one eye position tracking sensor to determine when any of at least one user touch and gaze is on average directed at an area that is within a visual element position zone of at least one of said plurality of visual element area for a time period exceeding a hovering time interval, and signal when said hovering time interval has been exceeded;
  said at least one processor also configured to use said at least one eye position tracking sensor to determine when said at least one eye is on average gazing in a direction that is within an eye position zone of at least one of said plurality of visual elements for a time period exceeding a hovering time interval, signaling when said hovering time interval has been exceeded, and if said gaze remains within the eye position zone of said at least one of said plurality of visual elements, without looking away, for a time period exceeding a keypress time interval, also registering that a virtual key corresponding to said at least one of said plurality of visual targets has been pressed by said user;
  said at least one processor further configured to accept input from any of said at least one touchpad or said at least one eye position tracking sensor to register that a virtual key corresponding to said at least one of said plurality of visual targets has been pressed by said user;
  and use said virtual key presses to control either transmitting or receiving said information to at least one computerized device outside of said head-mountable device's said frame.

20. The device of claim 19, wherein said device additionally comprises a camera directed to observe an outside environment, and wherein said virtual display additionally displays augmented reality virtual information.

* * * * *